United States Patent [19]

Smyser

[11] 3,818,087
[45] June 18, 1974

[54] PROCESS OF MAKING THERMAL SHACK-RESISTANT CERAMIC WARE
[76] Inventor: Clarence Michael Smyser, 7491 Tulpehocken St., Philadelphia, Pa. 19138
[22] Filed: June 26, 1970
[21] Appl. No.: 50,109

Related U.S. Application Data
[63] Continuation-in-part of Ser. No. 726,296, May 3, 1968, abandoned.

[52] U.S. Cl. .................. 264/65, 106/45, 264/56
[51] Int. Cl. .............................................. F27b 9/04
[58] Field of Search ............ 264/56, 65; 106/39, 45

[56] References Cited
UNITED STATES PATENTS
| | | | |
|---|---|---|---|
| 3,279,930 | 10/1966 | Van Der Beck, Jr. | 106/39 |
| 3,413,132 | 11/1968 | Fishwick | 264/63 |
| 3,690,904 | 9/1972 | Spangler | 264/56 |

OTHER PUBLICATIONS
E. J. Smoke, "Ceramic Compositions Having Negative Linear Thermal Expansion: Part II," July, 1953, Ceramic Age, at 13–20.
D. Weiss et al., "Hot–Pressing a Simple Petalite–Clay Body," February, 1961, Ceramic Bulletin, at 66–67.

Primary Examiner—Donald J. Arnold
Attorney, Agent, or Firm—Jackson, Jackson and Chovanes

[57] ABSTRACT

A ceramic stoneware or whiteware (porcelain) made of a thermal shock-resistant mix of certain proportions of coarse and fine particles of a lithium mineral petalite or spodumene, with a clay; ball clay and fireclay in the case of stoneware, and kaolin and permissibly ball clay in the case of whiteware. Shapes are fired at 1,236° to 1,285° C. inclusive (cones 8–10).

5 Claims, 2 Drawing Figures

PATENTED JUN 18 1974  3,818,087

INVENTOR.
Clarence Michael Smyser
BY
Jackson, Jackson and Chovanes
ATTORNEYS

PROCESS OF MAKING THERMAL SHACK-RESISTANT CERAMIC WARE

This application is a continuation-in-part of my copending application Ser. No. 726,296, filed May 3, 1968 and now abandoned for Thermal Shock-Resistant Clay and Process.

DISCLOSURE OF INVENTION

The present invention relates to ceramic stoneware or whiteware (porcelain) and its process of making.

A purpose of the invention is to provide a thermal shock-resistant clay product which is of very low thermal expansion and can withstand tremendous thermal shock.

A further purpose is to brighten glaze on stoneware and whiteware by providing a basic composition which will make the color of the glaze warmer.

A further purpose is to incorporate in a thermal shock-resistant stoneware composition of a character which is fired at 1,236° to 1,285° C. inclusive (cones 8–10), a relatively coarse lithium mineral in the form of 8–25 percent of petalite or 7–25 percent of spodumene, the coarse mineral having at least 65 percent and preferably 80 percent through 20 and on 200 mesh, a relatively fine lithium mineral of the character of 10–50 percent of petalite or spodumene, said fine mineral having at least 80 percent and preferably at least 90 percent through 200 mesh, with 20–40 percent of ball clay and 20–30 percent of fireclay when petalite only is employed, and the quantity of fine lithium mineral exceeds the quantity of coarse lithium mineral, 20–33 percent of fireclay when only petalite is employed and the quantity of coarse lithium mineral exceeds the quantity of fine lithium mineral, and with 20–32 percent of fireclay when spodumene is employed as at least one of the components.

A further purpose is to produce a thermal shock-resistant clay whiteware (porcelain) composition of a character which is fired at 1,236° to 1,285° C. inclusive (cones 8–10), by blending together a relatively coarse lithium mineral of the character of 8–25 percent of petalite and 7–25 percent of spodumene, said coarse mineral having at least 65 percent and preferably at least 80 percent through 20 and on 200 mesh, a relatively fine lithium mineral of the character of 10–50 percent of petalite or spodumine, said fine mineral having at least 80 percent through 20 mesh, with 25–83 percent of kaolin and up to 35 percent of ball clay, the inclusion of ball clay being optional.

Further purposes appear in the specification and in the claims.

The drawings show a flame test procedure used in determining the suitability of the products of the invention.

Figure 1:
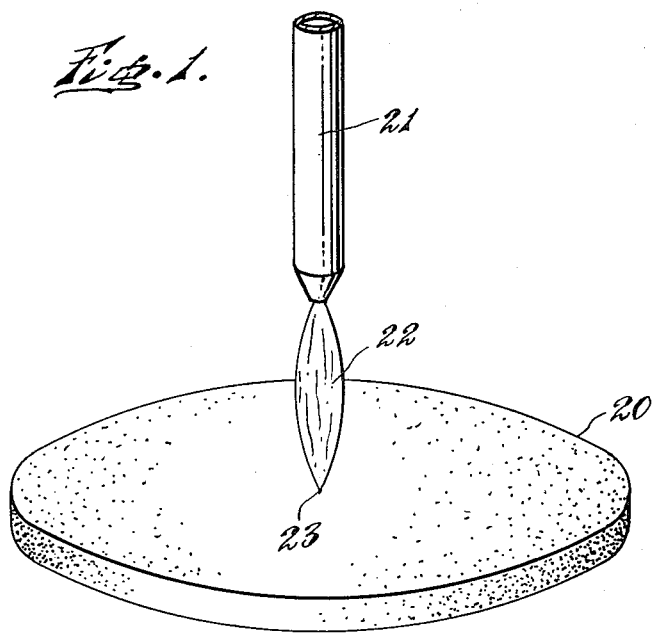
FIG. 1 is a perspective showing the flame test.
Figure 2:
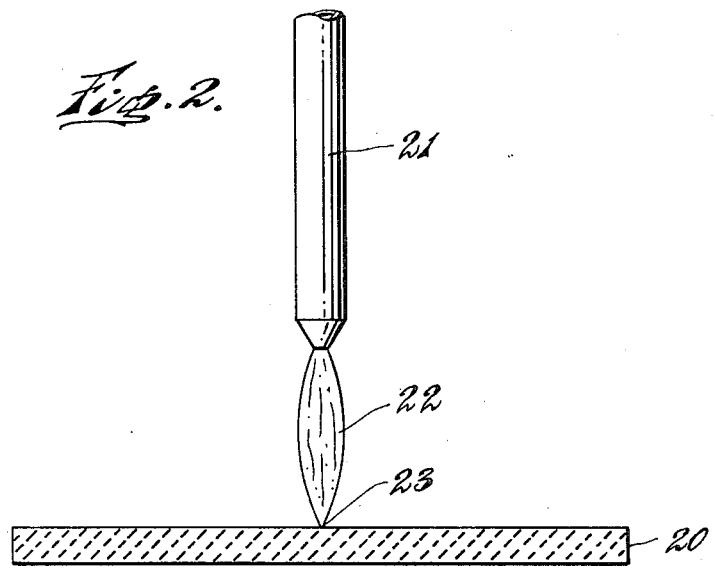
FIG. 2 is an axial section of the flame test shown in FIG. 1.

In the prior art extensive use has been made of lithium aluminum silicates such as petalite and spodumene and they have been known to provide ceramic compositions of low thermal expansion. Beck U.S. Pat. No. 3,279,930, granted Oct. 18, 1966, for Ceramic Product and its Preparation, provides a ceramic composition containing finely divided spodumene fired at cones 12–16 inclusive.

Beck U.S. Pat. No. 3,228,779, granted Jan. 11, 1966, for Refractory Products and Method of Making, describes a castable refractory composition having colloidal silica.

Genton U.S. Pat. No. 2,662,028, granted Dec. 8, 1953, for Mill Addition Agent for Enamel Slips relates to an enamel, and Arlett et al. U.S. Pat. No. 3,309,208, granted Mar. 14, 1967, for Methods for Controlling the Thermal Expansion Properties of Ceramics, employs a glass frit with a lithium mineral and clay.

Burgess et al. U.S. Pat. No. 2,260,000, granted Oct. 21, 1941, is for a Ceramic Composition which incorporates a potash soda-bearing aluminum silicate mineral with spodumene.

Smoke U.S. Pat. No. 2,726,964, granted Dec. 13, 1955, for Modified Quartz and Method of Making, is a quartzlike ceramic-containing lithium mineral.

McMillan et al U.S. Pat. Nos. 3,352,656 and 3,352,698, granted Nov. 14, 1967, describe glazes containing lithia.

The present invention is concerned with making stoneware and whiteware (porcelain) from clay mixtures which will be suitable for producing dishes, over dishes, crockery, refractories and other heat resistant ceramics of substantially clay base materials.

The products of the invention are fired at 1,236° to 1,285° C. inclusive (cones 8, 9 or 10), as is common practice in making stoneware and whiteware.

Unlike many prior art clay base stonewares and whitewares, the composition of the present invention is capable of withstanding high temperature gradients and rapid changes in temperature without cracking or checking.

As shown in the drawing, a test specimen ceramic disc 20 produced according to the invention and suitably fired can receive an impingement of an oxyacetylene flame 22 from a torch 21, at a point 23, for example near the middle, locallizing a very high temperature at that point, say 3,000°F., without cracking either in heating, or in cooling when the flame is removed after say 5 minutes.

Likewise, a container such as a dish made of the composition of the invention and containing ice can be placed in an oven or under an open flame such as a Bunsen burner or on top of a hot stove without danger of cracking due to the inequality in temperature.

I have discovered also that the stonewares and whitewares produced according to the invention when fired and then coated with conventional glazes and refired are much more effective in brightening the colors of the glazes than prior art stonewares and whitewares. In comparable tests, a warmer color is obtained from a glaze on the stoneware or whiteware of the invention than on a prior art stoneware or whiteware, the glaze being in every case conventional as well known in the art, such as iron oxide, cobalt carbonates, calcium carbonate and nephleine syenite. A wide variety of other well known glazes is advantageously used on the stoneware and whiteware of the invention.

The important aspect of the invention is the incorporation in a thermal shock-resistant clay, of a lithium mineral of the class consisting of petalite and spodumene in the form of two different components, one of which is a relatively coarse component and the other of which is a relatively fine component. In the case of making stoneware, the coarse and fine lithium mineral in the proper proportions are blended with ball clay and with fireclay. In the case of whiteware or porcelain, the coarse and fine lithium mineral in the correct proportions are blended with kaolin and optionally with ball clay.

COARSE LITHIUM MINDERAL

The coarse lithium mineral may be petalite or spodumene. These materials may be used either in the raw form or after calcining, for example to a temperature of the order of 450° to 500°C. or higher. A coarse petalite, nominally 20 mesh, and not calcined, may have a typical chemical analysis as follows:

| Chemical | Percent |
| --- | --- |
| $Li_2O$ | 4.24 |
| $Na_2O$ | 0.43 |
| $K_2O$ | 0.29 |
| $Al_2O_3$ | 16.07 |
| $Fe_2O_3$ | 0.033 |
| $SiO_2$ | 77.5 |
| L.O.I. | 0.89 |

A typical screen analysis for this product is as follows:

| Mesh | Percent |
| --- | --- |
| + 14 | 0 |
| + 18 | 1.4 |
| + 20 | 1.5 |
| +100 | 39.3 |
| +140 | 14.8 |
| +200 | 17.2 |
| −200 | 25.8 |

There is at least 65 percent coarser than 200 mesh.

In the case of spodumene of coarse particle size, a typical chemical analysis is as follows:

| Chemical | Percent |
| --- | --- |
| $Li_2O$ | 7.17 |
| $Na_2O$ | 0.27 |
| $K_2O$ | 0.29 |
| CaO | 0.35 |
| MgO | trace |
| MnO | 0.086 |
| $Cr_2O_3$ | 0.0004 |
| $Fe_2O_3$ | 0.62 |
| $Al_2O_3$ | 27.06 |
| $P_2O_5$ | 0.44 |
| $SiO_2$ | 63.66 |
| $TiO_2$ | 0.05 |
| L.O.I. | 0.40 |

The screen analysis of this coarse spodumene, not calcined, which may be considered to be 20 to 140 mesh, is typically as follows, nominally 30 mesh:

| Mesh | Percent |
| --- | --- |
| + 20 | 0.0 |
| + 30 | 0.1 |
| + 40 | 0.2 |
| + 50 | 4.9 |
| +100 | 65.3 |
| +140 | 21.1 |
| −140 | 8.5 |

Coarse spodumene calcined at 450° to 500° C. and converted at least partially into β spodumene, has a typical screen analysis as follows when in nominal size of 20 to 140 mesh, called 20 mesh:

| Mesh | Percent |
| --- | --- |
| + 20 | 4.0 |
| + 50 | 34.0 |
| +100 | 35.0 |
| +140 | 9.0 |
| −140 | 18.0 |

FINE LITHIUM MINERAL

Fine lithium mineral having at least 80 percent and preferably at least 90 percent through 200 mesh and nominally called 200 mesh, is also used in the present invention. A typical chemical analysis for 200 mesh spodumene is as follows:

| Chemical | Percent |
| --- | --- |
| $Li_2O$ | 7.1 |
| $Fe_2O_3$ | 0.58 |
| $Na_2O$ | 0.25 |
| $K_2O$ | 0.35 |
| $Al_2O_3$ | 24.4 |
| $SiO_2$ | 65.5 |
| CaO + MgO | 0.70 |
| $Cr_2O_3$ | 0.001 |
| L.O.I. | 0.5 |

A typical screen analysis for the fine lithium mineral is as follows:

| Mesh | Percent |
| --- | --- |
| + 20 | 0.0 |
| +100 | 0.3 |
| +140 | 1.0 |
| +200 | 5.3 |
| −200 | 93.5 |

The petalite and spodumene are on sale by Foote Mineral Co.

CLAY

Any suitable ball clay may be used, a suitable form being Hanover clay from United Clay Mines. The ball clay should be finely divided, almost entirely through 200 mesh.

The fireclay used should be finely divided, almost entirely through 100 mesh. A suitable fireclay is that supplied by A. P. Green Refractories Co.

The fireclay has the following screen analysis:

| | |
| --- | --- |
| Retained on 14 mesh | 0 − 1% |
| Retained on 20 mesh | 1 − 3% |
| Passes through 100 mesh | − 55% |

The chemical analysis of the fireclay is as follows:

| | |
| --- | --- |
| $SiO_2$ | 52 − 55% |
| $Al_2O_3$ | 30 − 33% |
| $Fe_2O_3$ | 1.0 − 1.75% |
| CaO | 0.05 − 0.5% |
| MgO | 0.3 − 0.4% |
| TiO | 1.5 − 2.3% |
| $Na_2O$ | 0.05 − 0.5% |
| $K_2O$ | 0.2 − 0.5% |
| Loss on ignition | 10 − 11% |

A suitable kaolin for use in making whiteware is EPK supplied with United Clay Mines. It is substantially entirely through 200 mesh.

STONEWARE

In making stoneware according to the invention the composition used is as follows:

| Component | Wider Range | Preferred |
| --- | --- | --- |
| Coarse petalite or | 8 – 25% | 10 – 15% |
| Coarse spodumene | 7 – 25% | 10 – 15% |
| Fine petalite or spodumene | 10 – 50% | 25 – 40% |
| Ball Clay | 20 – 40% | 25 – 35% |
| Fireclay with petalite only and quantity of fine lithium mineral exceeds quantity of coarse lithium mineral | 20 – 30% | 25 – 30% |
| Fireclay with petalite only and quantity of coarse lithium mineral exceeds quantity of fine lithium mineral | 20 – 33% | 25 – 30% |
| Fireclay with spodumene | 20 – 32% | 25 – 30% |

In making up the stoneware the dry powdered ingredients are mixed in the correct proportions, having previously been graded so that they are of the proper particle size. Any suitable ceramic mixer may be used. After mixing to obtain a uniform composition, the mix is moistened until it becomes plastic. In the typical case between 20 percent and 50 percent of the weight of the dry ingredients will be added to make the mix workable. The examples in the present case were produced using 20 percent of water on the dry ingredients.

After mixing, the plastic mix is formed into articles, using any suitable technique, for example a wheel, press, extruder, or otherwise. The formed shapes are then dried, for example at room temperature and then in a suitable drier for example at 250° F. for an adequate time, depending on the size of the articles. When completely dried the shapes are fired in a ceramic kiln at a temperature of cone 8-10 inclusive.

When completely dried the shapes are fired in a ceramic kiln at a temperature of 1,236° to 1,285° C. inclusive (cones 8-10). I find it desirable to raise the temperature on the objects to be fired, when they are of the order of three or four inches in diameter and one quarter inch thick, at a rate of 165° C. per hour from room temperature.

The fired shapes if they are to be glazed are then coated with a suitable glaze as set forth below. It is found that the color of the glaze is warmer than in the case of prior art stoneware.

WHITEWARE (PORCELAIN)

In making whiteware of porcelain according to the invention the following composition will be employed:

| Component | Wider Range | Preferred |
| --- | --- | --- |
| Coarse petalite or | 8 – 25% | 10 – 15% |
| Coarse spodumene | 7 – 25% | 10 – 15% |
| Fine petalite or spodumene | 10 – 50% | 30 – 45% |
| Kaolin | 25 – 83% | 30 – 50% |
| Ball clay (optional) | up to 35% | up to 30% |

The whiteware may be produced by the same technique used in producing the stoneware and it has the same properties of avoiding fracture by thermal shock and brightening the colors of a glaze. It will be fired in the range of 1,236° to 1,285° C. inclusive (cones 8–10). I find it desirable when the objects are about three inches in diameter and one quarter inch thick to raise the temperature 150°C. per hour from room temperature.

EXAMPLES A

Examples A show the results of 24 tests made on various compositions of coarse petalite nominally through 20 mesh (uncalcined), fine petalite nominally through 200 mesh (uncalcined), ball clay and fireclay. The compositions are shown in Table 1. In this table and in the others, in reporting results were no crack or fracture was noted under the 3,000° F. oxyacetylene flame pinpointed at the center of the test ceramic disc, an asterisk is used. Where fracture occurred in this test the word "no" is employed.

It will be observed that Table 1 shows satisfactory results in experiments 1–10, doubtful results in experiments 11 and 12 are unsatisfactory results in experiments 13–24.

Table 2 lists the ultimate analysis of the composition employed in test 1 of Table 1, it being noted that the ultimate analysis for each component of ball clay was multiplied by 20 percent since 20 percent of ball clay was used; the ultimate analysis for each component of fireclay was multiplied by 20 percent since 20 percent of fireclay was used; the ultimate analysis for 20 mesh petalite was multiplied by 10 percent since 10 percent of 20 mesh petalite was employed, and the ultimate analysis for 200 mesh petalite was multiplied by 50 percent since 50 percent of this material was employed. The totals show the analysis of the stoneware.

Table 3 is similar to Table 2, but shows the analysis for the composition used in test 5 of Table 1.

All of the specimens in Examples A and in all other examples were fired between cones 8 and 10 inclusive.

EXAMPLES B

Table 4 shows a series of eight experiments made with different compositions of 20 mesh petalite (uncalcined), with 200 mesh spodumene (uncalcined), ball clay and fireclay. All gave successful results under the fireclay exposure test. Table 5 shows the ultimate analysis for the composition in test 1 of Table 4.

EXAMPLES C

In Examples C tests are shown in Table 6 for compositions of 30 mesh spodumene (uncalcined), mixed with 200 mesh petalite (uncalcined), ball clay and fireclay. The mixes tested were successful in the flame test. Table 7 shows the ultimate analysis for the composition of test 2 in Table 6.

EXAMPLES D

Table 8 shows a series of tests made on 30 mesh spodumene (uncalcined), 200 mesh spodumene (uncalcined), ball clay and fireclay. The results as shown were all good in the flame test. Table 9 shows the ultimate analysis of the composition used in test 4 of Table 8.

EXAMPLES E

Table 10 shows a series of test results obtained for various compositions of 20 mesh spodumene calcined at a temperature of 450° to 500° C., 200 mesh petalite (uncalcined), ball clay and fireclay. All of the results were successful in the flame test.

EXAMPLES F

Table 11 shows the results obtained for various compositions of 20 mesh spodumene calcined at a temperature of 450° to 500° C., 200 mesh spodumene (uncalcined), ball clay and fireclay. The results as shown were all successful in the flame test.

EXAMPLES G

Table 12 shows the test results for various compositions for making whiteware (porcelain) from a mixture of 20 mesh petalite (uncalcined), 200 mesh petalite (uncalcined), kaolin and in some cases ball clay. The results obtained in the flame tests were uniformly good. Table 13 shows the ultimate analysis for the composition of test 6, Table 12.

It will be evident that the invention is unusual in permitting the making of a thermal shock-resistant material using clay mixtures which can be of the usual raw clay type, although calcined clays can be used if desired.

EXAMPLES H

Either stoneware or whiteware produced according to the invention is coated with a matte glaze having the following ingredients based on the dry weight:

| | |
|---|---|
| Nepheline syenite | 50 parts |
| Whiting (calcium carbonate) | 17 parts |
| Kaolin | 17 parts |
| Flint | 16 parts |
| Talc | 10 parts |

This composition is mixed dry and then water is added until the consistency is about that of cream. The glaze is coated on the stoneware or whiteware by brushing or spraying and the glaze is dried at room temperature, then dried at 250° F. and finally fired at 1,236° to 1,285° C. inclusive (cones 8, 9, or 10). The resultant glazed article is warmer in the opaque matte color than when applied over other types of stoneware and whiteware.

As a variation of this example, 2 percent of ferric oxide is incorporated in the glaze dry. The resultant celadon (off green) is brighter than that combined over other stoneware or whiteware.

This example may be modified by incorporation of 0.5 percent of cobalt carbonate and 1.5 percent of ferric oxide on the dry weight of the above glaze. This gives a bright green, and the color is warmer than that obtained from glazes applied over other stoneware and whiteware.

Similar properties are obtained by numerous other glazes when applied over the stoneware or whiteware of the invention.

When mesh is referred to herein it is intended to indicate Tyler Standard mesh per linear inch.

When percentages are referred to herein they are intended to be percentages by weight unless specifically otherwise indicated.

While the product can be made with entirely coarse petalite or entirely coarse spodumene, or entirely fine petalite or entirely fine spodumene, petalite and spodumene can be used respectively for the coarse or fine ingredients, or the coarse ingredient or the fine ingredient or both can be a mixture of petalite or spodumene.

The products of the invention are particularly desirable for vessels and dishes and plates, including ovenware. They have the usual properties of stoneware and whiteware, in that they are hard, vitrified and strong. They ring when struck with an instrument. They have 2 percent moisture absorption, indicating that the refractory has formed mullite. These properties are not, however, superior to other stonewares and whitewares, but are comparable and the thermal shock resistance is the peculiar properties that is most important in the present invention.

In view of my invention and disclosure, variations and modifications to meet individual whim or particular need will doubtless become evident to others skilled in the art to obtain all or part of the benefits of my invention without copying the composition and process shown, and I, therefore, claim all such insofar as they fall within the reasonable spirit and scope of my claims.

TABLE 1.—THERMAL SHOCK CLAY (STONEWARE)

| Test Series pp Test No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Petalite 20 mesh | 10 | 20 | 10 | 9.09 | 8 | 20 | 20 | 25 | 22.22 | 21.74 | 8.69 | 6.66 | 5.55 | 7 | 6 | 5 | 4 | 8 | 8 | 8 | 8 | 7 | 6 | 5 |
| Petalite 200 mesh | 50 | 40 | 40 | 31.81 | 30 | 30 | 20 | 10 | 22.22 | 10.87 | 10.87 | 8.88 | 8.88 | 30 | 30 | 30 | 30 | 28 | 27 | 26 | 25 | 25 | 25 | 25 |
| Ball clay | 20 | 20 | 30 | 31.81 | 35 | 30 | 35 | 38 | 27.77 | 34.78 | 42.39 | 43.33 | 44.44 | 32 | 33 | 33 | 34 | 32 | 33 | 33 | 34 | 35 | 35 | 35 |
| Fireclay | 20 | 20 | 20 | 27.27 | 27 | 20 | 25 | 27 | 27.77 | 32.60 | 38.04 | 41.11 | 41.11 | 31 | 31 | 32 | 32 | 32 | 32 | 33 | 33 | 33 | 34 | 35 |
| Results | (*) | (*) | (*) | (*) | (*) | (*) | (*) | (*) | (*) | (*) | | | No | No | No | No | No | No | No | No | No | No | No | No |

TABLE 2

| Analysis of Test 1, Table 1 | | $SiO_2$ | $Al_2O_3$ | $Fe_2O_3$ | $TiO_2$ | CaO | MgO | $K_2O$ | $Na_2O$ | $Li_2O$ |
|---|---|---|---|---|---|---|---|---|---|---|
| Petalite 20 Mesh | 10 | 7.75 | 1.60 | | | | | | | .42 |
| Petalite 200 Mesh | 50 | 38.75 | 8.0 | | | | | .11 | .21 | 2.10 |
| Ball Clay | 20 | 10.38 | 6.34 | .16 | .30 | .04 | .04 | .18 | .08 | 2.46 |
| Fireclay | 20 | 11.62 | 4.62 | .48 | .28 | .16 | .22 | .38 | .06 | 2.10 |
| TOTALS | | 68.50 | 20.56 | .64 | .58 | .20 | .26 | .67 | .35 | 7.18 |

TABLE 3

| Analysis of Test 5, Table 1 | | SiO$_2$ | Al$_2$O$_3$ | Fe$_2$O$_3$ | TiO$_2$ | CaO | MgO | K$_2$O | Na$_2$O | Li$_2$O |
|---|---|---|---|---|---|---|---|---|---|---|
| Petalite 20 Mesh | 8 | 6.20 | 1.28 | | | | | | | .32 |
| Petalite 200 Mesh | 30 | 23.25 | 4.80 | | | | | | | 1.26 |
| Ball Clay | 35 | 18.16 | 11.09 | .28 | .52 | .07 | .07 | .31 | .14 | |
| Fireclay | 27 | 15.68 | 6.24 | .64 | .37 | .22 | .30 | .51 | .08 | |
| TOTALS | | 63.29 | 23.41 | .92 | .89 | .29 | .37 | .82 | .22 | 1.58 |

TABLE 4

THERMAL SHOCK CLAY (Stoneware)

| Test Series P.S. Test No. | 1 | 2 | 3 | 4 | 5 | 6 | 7 | 8 |
|---|---|---|---|---|---|---|---|---|
| Petalite 20 Mesh | 8 | 8 | 8 | 8 | 8 | 8 | 8 | 7 |
| Spodumene 200 Mesh | 28 | 29 | 30 | 31 | 32 | 33 | 50 | 50 |
| Ball Clay | 32 | 32 | 31 | 31 | 30 | 30 | 21 | 22 |
| Fireclay | 32 | 31 | 31 | 30 | 30 | 29 | 21 | 21 |
| RESULTS | * | * | * | * | * | * | * | * |

TABLE 5

| Analysis of Test 1, Table 5 | SiO$_2$ | Al$_2$O$_3$ | Fe$_2$O$_3$ | TiO$_2$ | CaO | MgO | K$_2$O | Na$_2$O | Li$_2$O |
|---|---|---|---|---|---|---|---|---|---|
| Petalite 20 Mesh | 15.5 | 3.2 | | | | | .06 | .08 | .85 |
| Spodumene | 18.3 | 6.8 | .16 | | .10 | .09 | | | 1.99 |
| Ball Clay | 17.3 | 10.5 | .20 | .50 | .04 | .04 | .30 | .13 | |
| Fireclay | 19.0 | 7.7 | .80 | .47 | .27 | .37 | .63 | .10 | |
| TOTALS | 70.1 | 28.2 | 1.16 | .97 | .41 | .50 | .99 | .31 | 2.84 |

TABLE 6

THERMAL SHOCK CLAY (Stoneware)

| Test Series S.P. Test No. | 1 | 2 |
|---|---|---|
| Spodumene 30 Mesh | 8 | 7 |
| Petalite 200 Mesh | 30 | 30 |
| Ball Clay | 31 | 32 |
| Fireclay | 31 | 31 |
| RESULTS | * | * |

TABLE 8

THERMAL SHOCK CLAY (Stoneware)

| Test Series S.S. Test No. | 1 | 2 | 3 | 4 |
|---|---|---|---|---|
| Spodumene 30 Mesh | 10 | 9 | 8 | 7 |
| Spodumene 200 Mesh | 30 | 30 | 30 | 30 |
| Ball Clay | 30 | 31 | 31 | 32 |
| Fireclay | 30 | 30 | 31 | 31 |
| RESULTS | * | * | * | * |

TABLE 7

| Analysis of Test 2, Table 6 | SiO$_2$ | Al$_2$O$_3$ | Fe$_2$O$_3$ | TiO$_2$ | CaO | MgO | K$_2$O | Na$_2$O | Li$_2$O |
|---|---|---|---|---|---|---|---|---|---|
| Spodumene 30 Mesh | 4.45 | 1.89 | .04 | | .02 | | .02 | .02 | .50 |
| Petalite 200 Mesh | 23.25 | 4.80 | | | | | .07 | .14 | 1.27 |
| Ball Clay | 17.30 | 10.50 | .27 | .5 | .06 | .06 | .30 | .13 | |
| Fireclay | 18.00 | 7.16 | .80 | .4 | .20 | .30 | .60 | .10 | |
| TOTALS | 63.00 | 24.45 | 1.11 | .9 | .28 | .36 | .99 | .39 | 1.77 |

TABLE 9

| Analysis of Test 4, Table 8 | SiO$_2$ | Al$_2$O$_3$ | Fe$_2$O$_3$ | TiO$_2$ | CaO | MgO | K$_2$O | Na$_2$O | Li$_2$O |
|---|---|---|---|---|---|---|---|---|---|
| Spodumene 30 Mesh | 4.45 | 1.89 | .04 | | .02 | | .02 | .02 | .50 |
| Spodumene 200 Mesh | 19.65 | 7.32 | .17 | | .10 | .10 | .10 | .07 | 2.13 |
| Ball Clay | 17.30 | 10.50 | .20 | .5 | .07 | .07 | .30 | .10 | |
| Fireclay | 17.40 | 6.90 | .72 | .4 | .24 | .33 | .57 | .09 | |
| TOTALS | 58.80 | 26.61 | 1.13 | .9 | .43 | .50 | .99 | .28 | 2.63 |

TABLE 10

THERMAL SHOCK CLAY (Stoneware)

Test Series TgP

| Test No. | 1 | 2 | 3 | 4 | 5 | 6 |
|---|---|---|---|---|---|---|
| Calcined Spodumene 20 Mesh | 12 | 11 | 10 | 9 | 8 | 7 |
| Petalite 200 Mesh | 30 | 30 | 30 | 30 | 30 | 30 |
| Ball Clay | 29 | 30 | 30 | 31 | 31 | 32 |
| Fireclay | 29 | 29 | 30 | 30 | 31 | 31 |
| RESULTS | * | * | * | * | * | * |

TABLE 11

THERMAL SHOCK CLAY (Stoneware)

Test Series TgS

| Test No. | 1 | 2 | 3 | 4 | 5 |
|---|---|---|---|---|---|
| Calcined Spodumene 20 Mesh | 12 | 11 | 10 | 9 | 8 |
| Spodumene 200 Mesh | 30 | 30 | 30 | 30 | 30 |
| Ball Clay | 29 | 30 | 30 | 31 | 31 |
| Fireclay | 29 | 29 | 30 | 30 | 31 |
| RESULTS | * | * | * | * | * |

TABLE 12

THERMAL SHOCK CLAY (Whiteware - Porcelain)

Test Series Whiteware

| Test No. | 1 | 2 | 3 | 4 | 5 | 6 |
|---|---|---|---|---|---|---|
| Petalite 20 Mesh | 10 | 20 | 10 | 10 | 10 | 10 |
| Petalite 200 Mesh | 50 | 40 | 40 | 30 | 30 | 30 |
| Kaolin | 40 | 40 | 50 | 60 | 30 | 25 |
| Ball Clay | | | | | 30 | 35 |
| RESULTS | * | * | * | * | * | * |

TABLE 13

| Analysis of Test 6, Table 12 | $SiO_2$ | $Al_2O_3$ | $Fe_2O_3$ | $TiO_2$ | CaO | MgO | $K_2O$ | $Na_2O$ | $Li_2O$ |
|---|---|---|---|---|---|---|---|---|---|
| Petalite 20 Mesh | 7.75 | 1.60 | | | | | .03 | .04 | .42 |
| Petalite 200 Mesh | 23.25 | 4.80 | | | | | .09 | .12 | 1.26 |
| Kaolin | 11.20 | 9.70 | .1 | .4 | .02 | .02 | .05 | .05 | 3.05 |
| Ball Clay | 17.30 | 10.50 | .2 | .5 | .07 | .07 | .30 | 1.00 | |
| TOTALS | 59.50 | 26.60 | .3 | .9 | .09 | .09 | .35 | 1.21 | 4.73 |

Having thus described my invention what I claim as new and desire to secure by Letters Patent is:

1. A process of making stoneware shapes which are resistant to thermal shock, which comprises dry mixing 10–15 percent, based on the weight of the total dry mixture, of coarse petalite or spodumene, said coarse petalite being more specifically a material considered to be a −20 mesh product and said coarse spodumene being more specifically a material considered to be a −20 +140 mesh product and in the case of both the coarse petalite and the coarse spodumene having as a particular part of its characteristics at least 65 percent through 20 mesh per linear inch and on a 200 mesh screen, and 10–50 percent, based on the weight of the total dry mixture, of petalite or spodumene having at least 80 percent through a 200 mesh per linear inch screen, with 20 to 40 percent based on the weight of the total dry mixture of ball clay and fireclay in the following proportions:

when only petalite is used and the quantity of fine lithium mineral exceeds the quantity of coarse lithium mineral — 20-30 percent when only petalite is used and the quantity of coarse lithium mineral exceeds the quantity of fine lithium mineral — 20-33 percent when spodumene is used as at least one of the compounds — 20-32 percent.

moistening the mix with a suitable amount of water, forming the mix into shapes, drying the shapes and firing the shapes at cones 8–10.

2. A process of making whiteware shapes which are resistant to thermal shock which comprises dry mixing 10-15 percent, based on the weight of the total dry mixture, of coarse petalite, said coarse petalite being more specifically a material considered to be a −20 mesh product and the coarse petalite having as a particular part of its characteristics at least 65 percent through 20 mesh per linear inch and on a 200 mesh screen, and 10-50 percent, based on the weight of the total mixture, of petalite having at least 80 percent through a 200 mesh per linear inch screen, with 25-83 percent, based on the weight of the total dry mixture, of kaolin, and from a substantial amount to 35 percent, based on the weight of the total dry mixture, of ball clay, moistening the mixture with water in a suitable amount, forming the mix into shapes, drying the shapes and firing the shapes at cones 8–10.

3. A process of claim 1 in which the mix contains 25–40 percent of fine petalite or spodumene.

4. A process of claim 2, in which the mix contains 30-45 percent of fine petalite.

5. A process of making stoneware shapes which are resistant to thermal shock, which comprises dry mixing from about 21.74 percent to and including about 25 percent, based on the weight of the total dry mixture, of coarse petalite, having at least 65 percent through 20 mesh per linear inch and on a 200 mesh screen, and from about 10 percent to and icluding about 10.87 percent, based on the weight of the total dry mixtures, of petalite having at least 80 percent through a 200 mesh per linear inch screen, with from about 34.78 percent to and including about 38 percent, based on the weight of the total dry mixture, of ball clay, and from about 27 percent to and including about 32.60 percent, based on the weight of the total dry mixture, of fireclay, moistening the mix with from 20-50 percent of water on the weight of the dry ingredients, forming the mix into shapes, drying the shapes and firing the shapes at 1,236° to 1,285°C.

* * * * *